No. 616,388. Patented Dec. 20, 1898.
A. ABRAMSON.
COTTON CHOPPER AND CULTIVATOR.
(Application filed Sept. 8, 1898.)
(No Model.) 3 Sheets—Sheet 1.

Witnesses
Percy C. Bowen
John Chalmers Wilson

Inventor
A. Abramson
by Wilkinson & Fisher,
Attorneys.

No. 616,388. Patented Dec. 20, 1898.
A. ABRAMSON.
COTTON CHOPPER AND CULTIVATOR.
(Application filed Sept. 8, 1898.)

(No Model.) 3 Sheets—Sheet 2.

Witnesses
Percy C. Bowen
John Chalmers Tolson

Inventor
A. Abramson,
by Wilkinson & Fisher,
Attorneys

No. 616,388. Patented Dec. 20, 1898.
A. ABRAMSON.
COTTON CHOPPER AND CULTIVATOR.
(Application filed Sept. 8, 1898.)
(No Model.) 3 Sheets—Sheet 3.
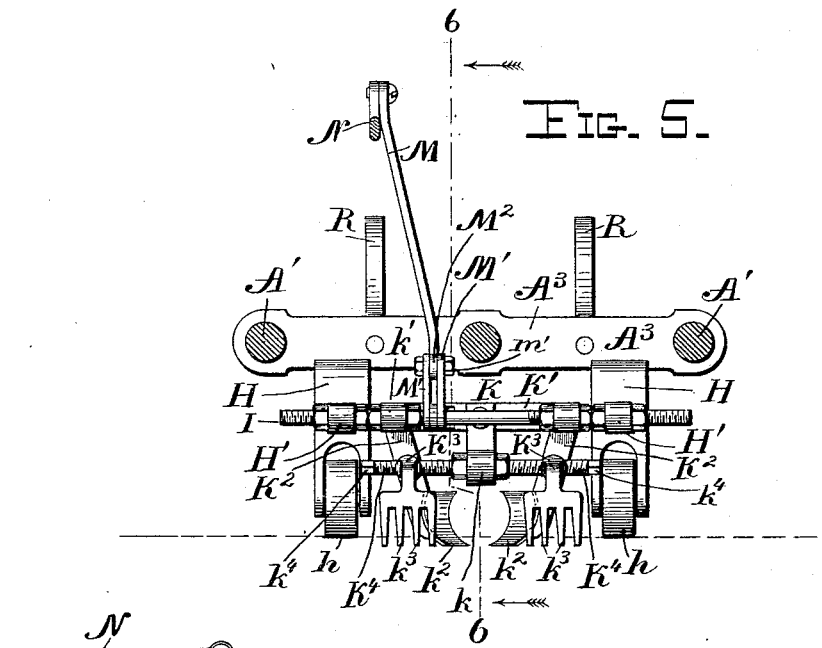
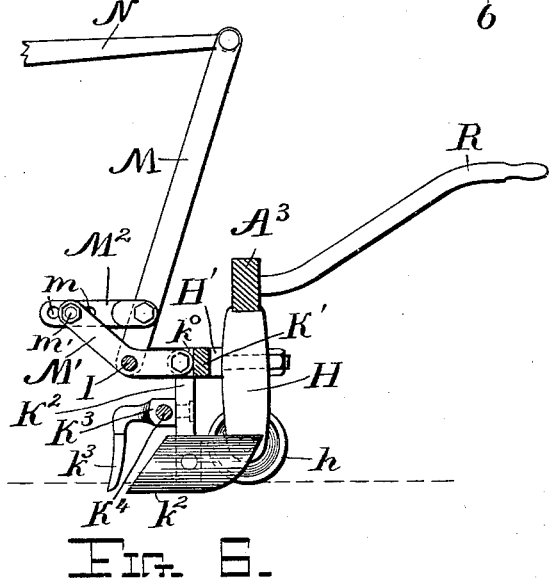
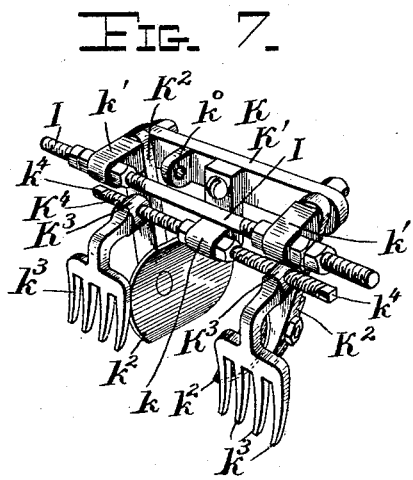
Witnesses
Percy C. Bowen
John Chalmers Lockran
Inventor
A. Abramson,
by Wilkinson & Fisher,
Attorneys.
THE NORRIS PETERS CO., PHOTO-LITHO., WASHINGTON, D. C.

UNITED STATES PATENT OFFICE.

ABE ABRAMSON, OF BATON ROUGE, LOUISIANA.

COTTON CHOPPER AND CULTIVATOR.

SPECIFICATION forming part of Letters Patent No. 616,388, dated December 20, 1898.

Application filed September 8, 1898. Serial No. 690,494. (No model.)

*To all whom it may concern:*

Be it known that I, ABE ABRAMSON, a citizen of the United States, residing at Baton Rouge, in the parish of East Baton Rouge and State of Louisiana, have invented certain new and useful Improvements in Cotton-Choppers; and I do hereby declare the following to be a full, clear, and exact description of the invention, such as will enable others skilled in the art to which it appertains to make and use the same.

My invention relates to improvements in cotton-choppers, the object being to produce a machine of this class which will chop the surplus cotton-plants out of the row, leaving the plants in the hills at the proper distance apart, and will also cultivate and hill up the plants thus left.

Figure 1:
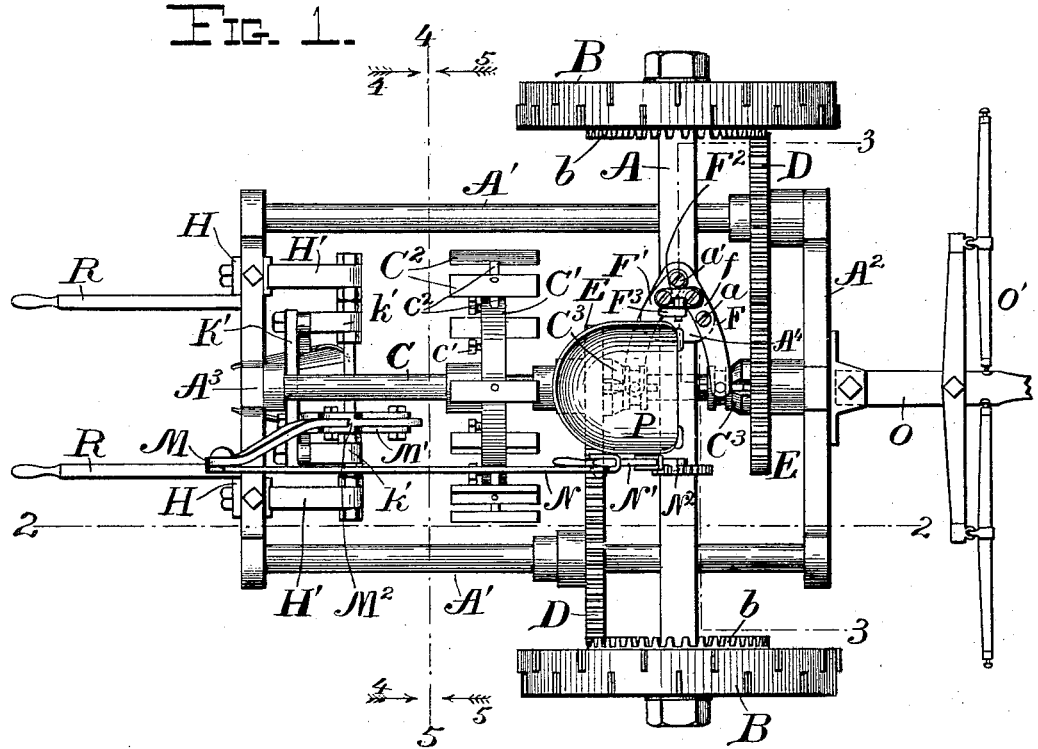
Figure 2:
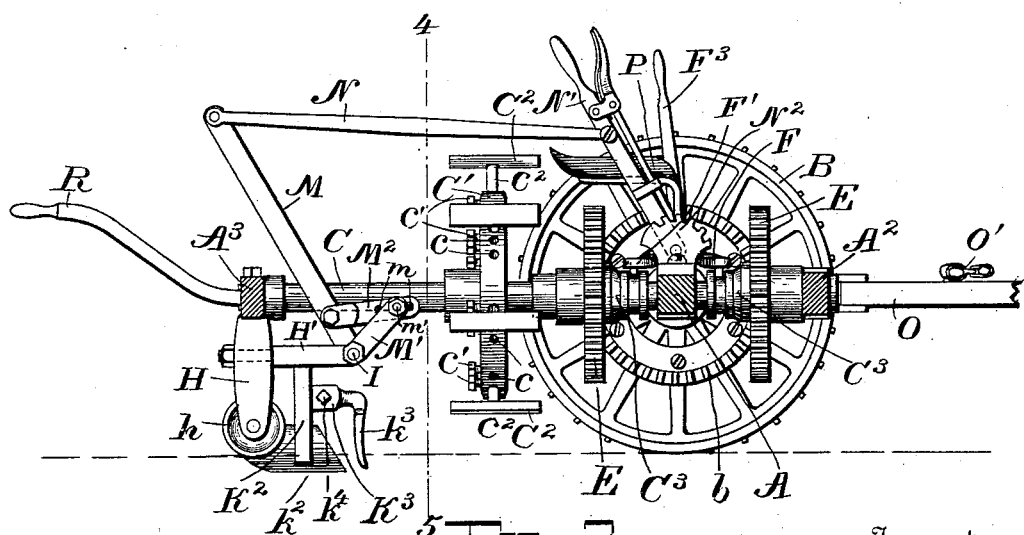
Figure 3:
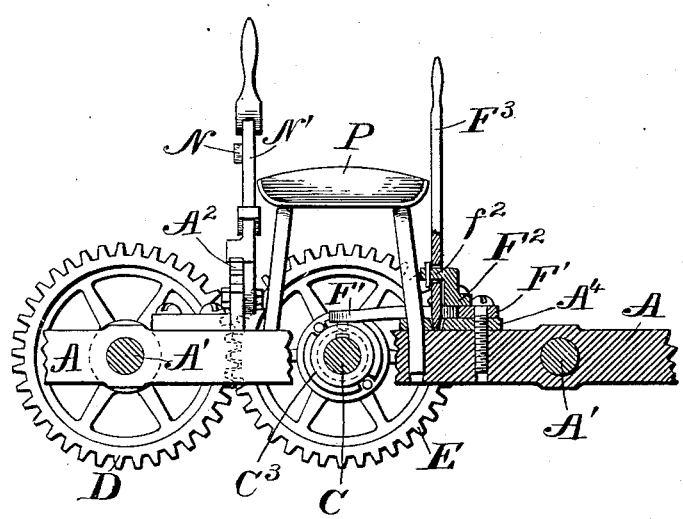
Figure 4:
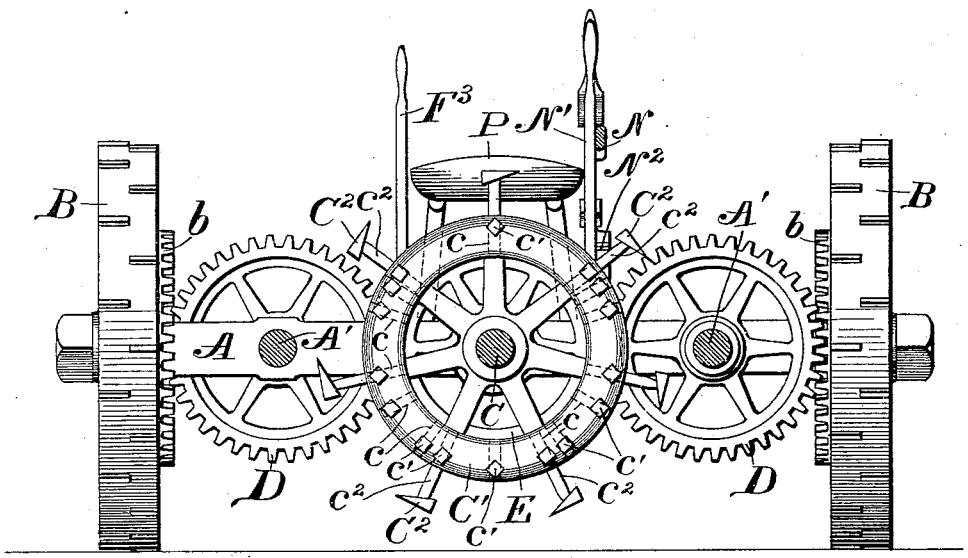

Referring to the accompanying drawings, in which like letters of reference designate the same parts in the several views, Figure 1 represents a plan of my improved cotton-chopper. Fig. 2 represents a longitudinal section of the same, taken on the line 2 2 of Fig. 1. Fig. 3 is a detail view of a part of the gearing of the machine, the view being a section taken on the line 3 3 of Fig. 1 and looking toward the rear of the machine. Fig. 4 is a transverse sectional view of the device, taken on the line 4 5 of Figs. 1 and 2 and looking in the direction of the arrows 4 4. Fig. 5 is also a transverse sectional view taken on the line 4 5 of Fig. 1, but looking in the opposite direction, as indicated by the arrows 5 5, and showing in front elevation the plows and cultivating devices. Fig. 6 is a sectional view taken on the line 6 6 of Fig. 5, and Fig. 7 is a detail perspective view of the plows and cultivating devices and means for adjusting the same.

The several parts of my machine are supported mainly upon an axle A, on the ends of which are journaled in the usual manner the wheels B. The side bars A' pass through the axle and are connected together at their ends by the front and rear end bars $A^2$ and $A^3$, forming a rectangular frame, as shown in Fig. 1.

The central bar or shaft C is revolubly mounted in the axle A and the end bars $A^2$ and $A^3$ and has mounted rigidly thereon, slightly in rear of the middle of the machine, the chopper-wheel C', which latter is provided with holes or sockets $c$ to receive the shanks $c^2$ of the chopper-blades $C^2$. The sockets $c$ may be so arranged that any number of blades may be employed and arranged at equal distances apart around the periphery of the chopper-wheel. In the drawings I have shown the sockets $c$ so arranged that five, six, or seven blades may be used, seven being shown upon the wheel, and spaced equally around the periphery of the said wheel. The length of the blades may be varied to suit the length of the space desired to be cleared in the rows of cotton, and when the blades are short a greater number may be used. The blades are held firmly in the sockets by the set-screws $c'$.

A crown-wheel $b$ is secured to the inner sides of each of the wheels B, and these mesh with spur-wheels D, revolubly mounted on the side bars A', which latter wheels in turn mesh with spur-wheels E, revolubly mounted on the central bar or shaft C.

The spur-wheels E are arranged one on each side of the axle A, and between each of the said spur-wheels and the axle is mounted a clutch member $C^3$, arranged to slide on a feather-key on the central bar or shaft C, the other members to form the clutch being a part of the wheels E.

A plate $A^4$ is secured upon the axle A to one side of the middle thereof, and to this plate are pivoted, as at $a$ and $a'$, two levers F and F', which are connected at their free ends with the two clutch members $C^3$. The lever F' is pivoted at its end, while the lever F is pivoted a short distance from the end, leaving a short arm $f$, which is connected by a link $F^2$ with the other lever F', as shown in Fig. 1. Thus it will be seen that by moving the link $F^2$ rearwardly the free ends of the levers, to which the clutch members $C^3$ are attached, will be moved away from each other and toward the spur-wheels E, causing the clutch members to engage and the shaft C and chopper-wheel C' to rotate, as will be readily understood.

A lever $F^3$ is pivoted to the plate $A^4$ and connected, as at $f^2$, with the link $F^2$ for the purpose of moving the said link and levers F and F' to engage or disengage the said clutch members and cause the chopper-wheel to rotate or remain stationary, as may be desired.

To the rear bar A³ are secured two downwardly-projecting standards H, having journaled in their lower ends small wheels $h$, which carry the weight of the rear portion of the machine.

Projecting forwardly from the standards H are other standards H', in the forward ends of which is supported a rod I, upon which is pivoted a frame K, carrying the cultivating devices. The frame K consists of a bar K', having at each end a forwardly-extending piece $k'$, through which passes the rod I. Pivoted upon each of the pieces $k'$ close to the bar K' is a downwardly-extending piece K², to the lower ends of which pieces K² are secured the plows $k^2$. Upon the forward sides of the pieces K² are pivoted lugs K³, which are elongated and bent downwardly at their forward ends and finally formed into prongs or teeth $k^3$, which extend down in front of the plows and loosen the earth ready for the plows to throw it against the cotton-plants. The lugs K³ are perforated and screw-threaded to receive a rod K⁴, which is journaled in a bracket $k$, projecting downwardly from the bar K', and the said rod is screw-threaded in opposite directions on each side of the said bracket, the ends being squared, as at $k^4$, to facilitate turning the same. By turning the rod K⁴ the plows $k^2$ and the teeth $k^3$ may be moved nearer to or farther away from each other.

A lever M is pivoted on the rod I between two bent arms M', one end of which arms is secured to a perforated lug $k^0$ upon the bar K', the other end being secured to a link M², which link is connected at its other end with the lever M. The link M² is provided with a series of holes $m$, through either one of which the bolt $m'$ may be passed to vary the inclination of the lever M.

It will be seen by reference to Fig. 6 that by moving the lever M the frame K will be turned about the rod I, and thus raise or lower the cultivating devices.

The lever M is connected by a rod N with a lever N', pivoted upon the axle A and provided with a pawl-and-ratchet device N² for holding the said lever N' in any desired position, thus holding the cultivating devices in the proper positions.

The usual tongue O and doubletree O' are secured to the front of the machine, and a seat P is supported above the axle in any suitable manner.

A pair of handles R are secured to the rear bar A³ of the frame of the machine, so that a man may walk behind and steady the device when necessary.

In operation as the machine moves forward the chopper-wheel will revolve and each blade C² will chop out a portion of the cotton-plants from the row, leaving a space proportionate to the length of blade used. The cultivating devices following the chopper-wheel will loosen the earth on each side of the row and throw it toward the remaining plants.

Having thus described my invention, what I claim as new, and desire to secure by Letters Patent of the United States, is—

In a cotton-chopper, the combination of a frame mounted on wheels, a central shaft mounted in the said frame, a chopper-wheel mounted on the said shaft, a series of chopper-blades mounted on the said wheel, and gear-wheels mounted on the said central shaft and geared to the said wheels; of clutch members mounted to slide on the central shaft, levers pivoted on the said frame and connected with the said clutch members, a link connecting the short arm of one lever with the other lever, and means for moving the said link to cause the two levers to move away from, or nearer to each other, substantially as described.

In testimony whereof I affix my signature in presence of two witnesses.

ABE ABRAMSON.

Witnesses:
T. A. MOORE,
ISADORE WEIS.